United States Patent
Sim

(10) Patent No.: US 7,109,777 B2
(45) Date of Patent: Sep. 19, 2006

(54) APPARATUS FOR CANCELLATION OF DC OFFSET IN TIME DIVISION DUPLEXING MODE DIRECT CONVERSION RECEIVER

(75) Inventor: Dae-Hyun Sim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 34 days.

(21) Appl. No.: 10/912,663

(22) Filed: Aug. 5, 2004

(65) Prior Publication Data

US 2005/0062513 A1 Mar. 24, 2005

(30) Foreign Application Priority Data

Sep. 24, 2003 (KR) ...................... 10-2003-0066344

(51) Int. Cl.
*H03L 5/00* (2006.01)
(52) U.S. Cl. ...................... 327/307; 375/319
(58) Field of Classification Search ............... 327/307; 375/319
See application file for complete search history.

(56) References Cited

U.S. PATENT DOCUMENTS 5,748,681 A 5/1998 Comino et al. ............. 375/319

6,184,939 B1 * 2/2001 Wang et al. ................ 348/625
6,353,641 B1 * 3/2002 Macq et al. ................ 375/319

FOREIGN PATENT DOCUMENTS

EP 0 895 385 2/1999
EP 921663 A2 * 6/1999

* cited by examiner

*Primary Examiner*—Quan Tra
(74) *Attorney, Agent, or Firm*—Dilworth & Barrese LLP

(57) ABSTRACT

A DC offset cancellation apparatus in a time division duplexing mode direct conversion receiver is disclosed that cancels DC offset of a present frame by using DC offset information of a previous frame by using a receive time difference between data transmission frames. Therefore, the DC offset cancellation unit has advantages of canceling the DC offset in an active mode in real time, of canceling the DC offset varying depending on time and circumferential conditions, and of minimizing power consumption by using an optimized element alignment.

6 Claims, 5 Drawing Sheets

APPARATUS FOR CANCELLATION OF DC OFFSET IN TIME DIVISION DUPLEXING MODE DIRECT CONVERSION RECEIVER

PRIORITY

This application claims priority to an application entitled "Apparatus For Cancellation Of DC Offset In Time Division Duplexing Mode Direct Conversion Receiver" filed in the Korean Industrial Property Office on Sep. 24, 2003 and assigned Serial No. 2003-66344, the contents of which are hereby incorporated by reference.

BACKGROUND OF THE INVENTION

1. Field of the Invention

The present invention relates to a DC offset cancellation apparatus, and more particularly to a DC offset cancellation apparatus in a time division duplexing mode direct conversion receiver.

2. Description of the Related Art

In general, a receiver of a communication apparatus generates DC offset. Such DC offset distorts an amplitude of a received signal so that an undesirable signal is received. At this time, if a signal received in the receiver is large, distortion of the signal may cause a receiving function of the receiver to stop. Also, such amplitude distortion causes the receiver to have an erroneous RSSI (Received Signal Strength Indicator) so that the amplitude distortion also exerts an influence when controlling an output of a transmitter. As a result, it is necessary to cancel the DC offset of the receiver.

Usually, the DC offset of the receiver is canceled by using AC-coupling or by repeatedly performing charge or discharge in TDMA (Time Division Multiple Access). In the former, i.e. using the AC-coupling, when canceling the DC offset by means of a high-pass filter, it is possible to lose near-DC information. It is known that the latter, i.e. repeatedly performing charge or discharge in TDMA, is not suitable for canceling the DC offset generated by re-radiation through an antenna in an active mode.

Also, a conventional offset cancellation technique is realized by using a mean value, a measurement unit, an auto gain controller (AGC) value, an integrator and so forth, in such a manner that the offset cancellation can be used for the active mode regardless of either a Frequency Division Duplexing (FDD) mode (i.e., CDMA 2000-Qualcomm) or a Time Division Duplexing (TDD) mode. However, this conventional offset cancellation technique increases a chip area and power consumption because it requires use of such various digital elements.

Also, conventional DC offset cancellation techniques in a digital domain cannot deal with re-radiation, which randomly varies depending on time (the number of clock cycles) required for calculating the mean value. Furthermore, if the time for calculating the mean value is extended, the conventional DC offset cancellation technique can lose a real-time characteristic of detection and correction. Conventionally, communication standards are not based on such hardware constraints. In addition, an FDD system must perform an additional calculation for obtaining an AGC value due to dispersion of AGC gain parameters in an analog/digital domain. Also, FDD systems require a complex interface with respect to a CPU (Central Process Unit) while performing a gain control process.

Meanwhile, since an offset cancellation unit used for a conventional TDD mode is required to detect preamble data, it is unnecessary to perform an additional calculation for extracting dispersed AGC parameters. However, since such an offset cancellation unit creates time delay, the offset cancellation unit loses its real-time characteristic.

SUMMARY OF THE INVENTION

Accordingly, the present invention has been made to solve the above-mentioned problems occurring in the prior art, and a first object of the present invention is to provide an apparatus for canceling DC offset in an active mode in real time.

A second object of the present invention is to provide an apparatus for canceling the DC offset, which varies depending on time and environmental conditions.

A third object of the present invention is to provide an apparatus that cancels DC offset while minimizing power consumption by use of an optimized element alignment.

In order to accomplish these objects, there is provided a DC offset cancellation apparatus in a time division duplexing mode direct conversion receiver, wherein the DC offset cancellation apparatus cancels DC offset of a present frame by using DC offset information of a previous frame and by using a receive time difference between data transmission frames.

According to an exemplary embodiment of the present invention, the DC offset cancellation apparatus comprises a first register for storing a predetermined-ideal DC value; a second register for storing a first sampled DC offset read from data channels; a first subtracter for subtracting the predetermined-ideal DC value stored in the first register from the first sampled DC offset stored in the second register; a third register for temporarily storing a result value of the first subtracter until a second sampled DC offset value of a next data transmission frame is loaded into the second register from data channels of the next frame; and a second subtracter for subtracting the result value temporarily stored in the third register from the second sampled DC offset value loaded in the second register if the second sampled DC offset value is loaded into the second register from the data channels of the next frame.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
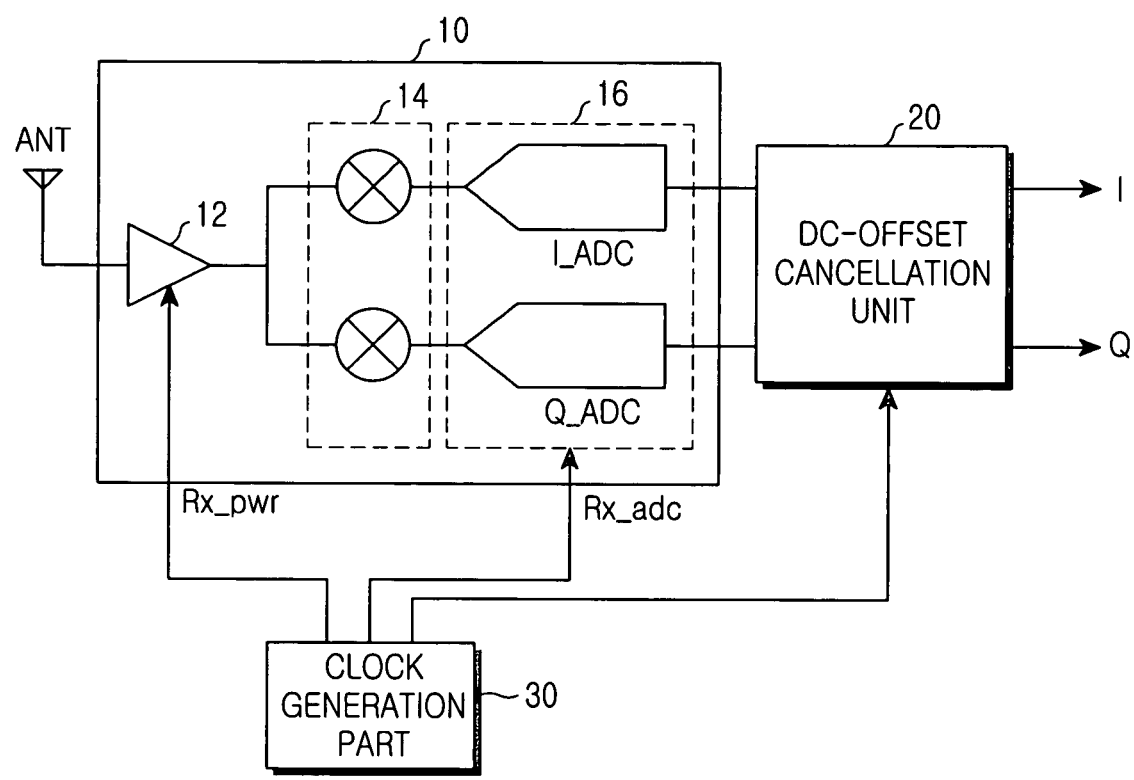
FIG. 1 is a block diagram showing a time division duplexing mode direct conversion receiver having a DC offset cancellation unit according to one embodiment of the present invention.

Hereinafter, preferred embodiments of the present invention will be described in detail with reference to the accompanying drawings. Note that the same or similar components in the drawings are designated by the same reference numerals as far as possible although they are shown in different drawings. In the following description of the present invention, a detailed description of known functions and configurations incorporated herein are omitted to avoid making the subject matter of the present invention unclear.

The present invention relates to an apparatus for canceling DC offset exerting a serious influence on receiver performance in a direct-conversion mode and for realizing a multi-mode by simplifying a structure of a receiver, while reducing the number of parts and power consumption. In addition, according to the present invention, up/down links are realized in one frame in a communication system having a time division duplexing (TDD) mode. Also, the present invention relates to a technique based on standards (IEEE 802.16e—International Standard, HPI-Domestic Standard) in which an up/down link transmission is performed within a predetermined time interval.

FIG. 1 is a block diagram schematically showing a time division duplexing mode direct conversion receiver having a DC offset cancellation unit 20 according to one embodiment of the present invention.

Referring to FIG. 1, the time division duplexing mode direct conversion receiver having the DC offset cancellation unit 20 includes a receive signal processing part 10, a DC offset cancellation unit 20, and a clock generation part 30.

The receive signal processing part 10 is a device for modulating data received through an antenna (ANT) so as to output In-phase & Quadrature (I&Q) data. Also, the receive signal processing part 10 includes a Low Noise Amplifier (LNA) 12, a mixer 14, and an ADC (Analog Digital Converter) 16 therein. At this time, each device of the receive signal processing part 10 is controlled by clocks Rx_pwr and Rx_adc generated from the clock generation part 30. Such receive signal processing part 10 is commonly included in a conventional receiver. Accordingly, a detailed description of the receive signal processing part 10 will be omitted.

The DC offset cancellation unit 20 cancels DC offset of the I&Q data outputted from the receive signal processing part 10 depending on clocks rega_wr, regb_wr, regc_wr, sub1, and sub2 generated by the clock generation part 30. Hereinafter, a method for controlling operations of the DC offset cancellation unit 20 by the clocks will be described in detail.

Figure 2:
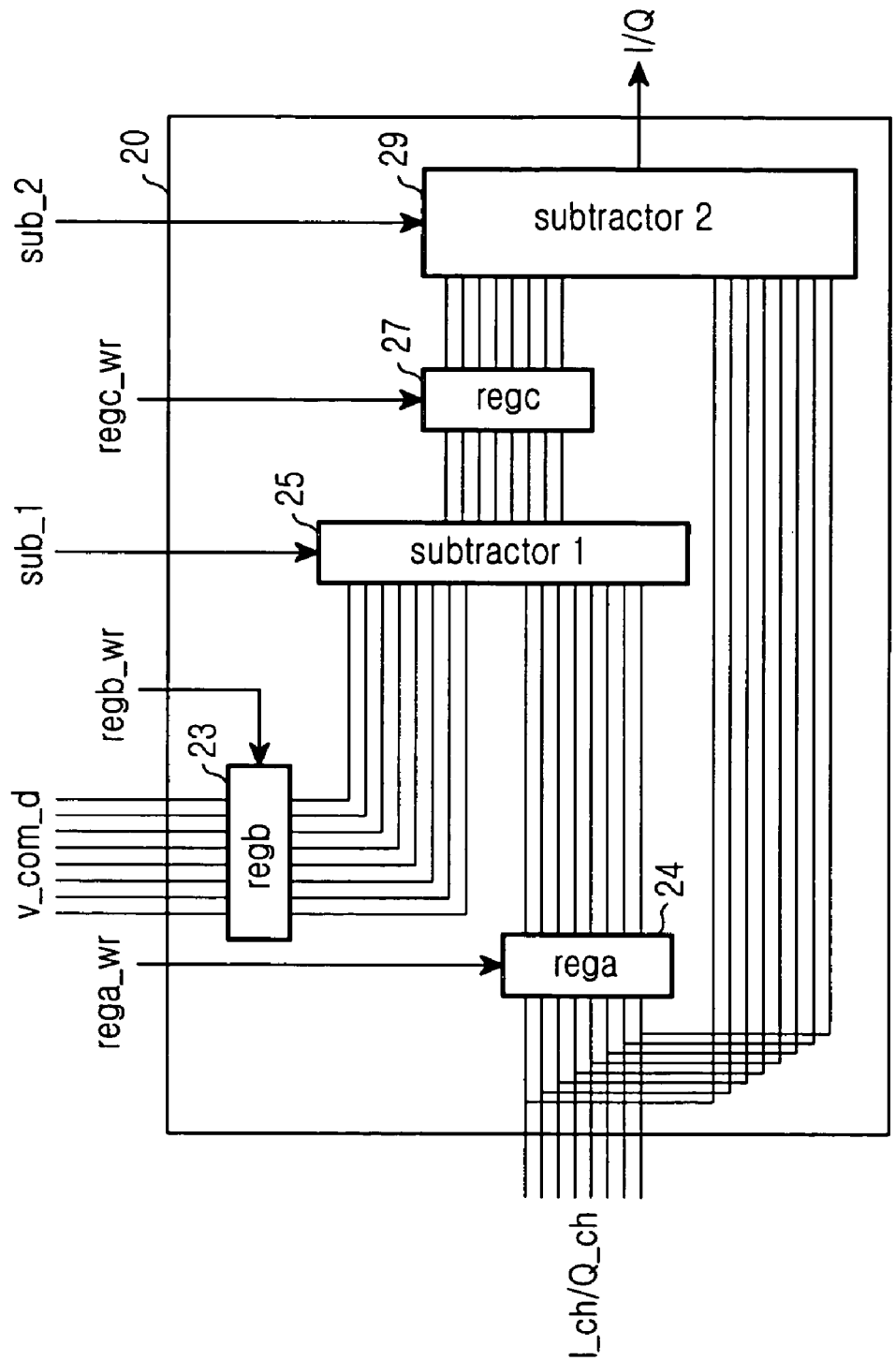
FIG. 2 is a view of a DC offset cancellation unit according to one embodiment of the present invention.

FIG. 2 is a block diagram showing the DC offset cancellation unit 20 according to one embodiment of the present invention. Referring to FIG. 2, the DC offset cancellation unit 20 according to one embodiment of the present invention includes three register blocks, rega 24, regb 23, and regc 27, and two subtracters, a first subtracter 25 and a second subtracter 29. Also, it is necessary for the DC offset cancellation unit 20 to have control signals and clock signals in order to control the above elements. In other words, a first register block rega 24, a second register block regb 23, and a third register block regc 27 are controlled by a first register write control signal rega_wr, a second register write control signal regb_wr, and a third register write control signal regc_wr, respectively. Also, the first subtracter 25 and the second subtracter 29 are controlled by a first subtracter operation control signal sub 1 and a second subtracter operation control signal sub 2, respectively. When such DC offset cancellation unit 20 is used for a direct receiver, the direct receiver is required to include twice as many of the above elements. That is, six register blocks and four subtracters are provided. This is because the direct receiver has I&Q receiving paths. Also, the bit number of each element is the same as the bit number of ADC 16 (see FIG. 1). In addition, a sign bit is required.

Hereinafter, an operation of the DC offset cancellation unit 20 according to the present invention will be described.

Figure 3:
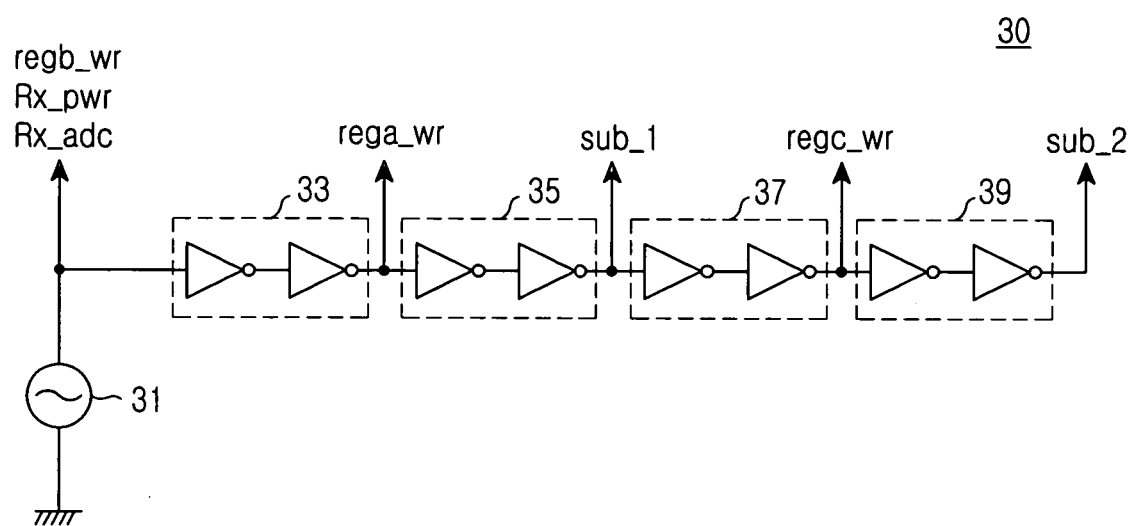
FIG. 3 is a view of a clock generation unit according to one embodiment of the present invention.

First, the regb 23 stores a predetermined-ideal DC value (i.e. '0' VDC) under the control of the clock regb_wr. Clock regb_wr is not delayed and is preferably provided by clock generating unit 31 (FIG. 3, described below). At this time, the regb 23 reads and stores the DC value loaded on a 'v_com_d' channel. In other words, the regb 23 reads the predetermined ideal DC value, which is preset for the purpose of test or usage of a fixed offset, from external devices, i.e. Central Process Unit (CPU, not shown), and stores it therein.

Also, the rega 24 starts to write by the clock rega_wr so as to store sampled DC offset read from an I-channel or Q-channel.

Meanwhile, when the clock sub_1 is applied to the first subtracter 25, the first subtracter 25 subtracts a binary value of the DC value stored in the regb 23 from the DC offset stored in the rega 21. Also, a first result value of the subtraction operation is stored in the regc 27 under the control of the clock regc_wr. At this time, the clock regc_wr is held until an ADC sample value of a next frame is loaded in the rega 24. In addition, when the ADC sample value of the next frame is loaded in the rega 24, the second subtracter (subtracter 2) 29, which is controlled by the clock sub_2, outputs a second result value after subtracting the first result value stored in the regc 27 from the ADC sample value stored in the rega 24 as I or Q data.

At this time, the clocks controlling the registers and the subtracters are generated within a receive time gap RTG of up/down links realized in one frame (e.g., 5 µs) to control the registers and the subtracters in such a manner that the registers and the subtracters perform corresponding operations. The receive time gap RTG is a time difference established by considering a transmission delay of the up/down links so as to stop disturbance between transmission and reception when the transmission and the reception are achieved in one frame. In addition, the RTG provides a sufficient time difference to cancel the DC offset described above.

FIG. 3 is a block diagram showing the clock generation part 30 according to one embodiment of the present invention.

Referring to FIG. 3, the clock generation part 30 includes a plurality of delay elements 33, 35, 37, and 39. Also, each clock is outputted after being delayed by an amount of delay time of each delay element in order to control operations of the DC offset cancellation part 20 shown in FIG. 2. FIG. 3 shows one arrangement of the delay elements 33, 35, 37, and 39 by using a plurality of inverters. Referring to FIG. 3, the clock generation part 30 firstly outputs regb_wr, Rx_pwr and Rx_adc. Then, the clock generation part 30 sequentially outputs rega_wr, sub_1, regc_wr, and sub_2 after a predetermined time delay interval of each respective delay element. As described above, each clock for controlling the operations of the DC offset cancellation unit 20 is outputted with a predetermined time delay interval, so that the DC offset cancellation unit 20 shown in FIG. 2 can be operate as described above.

Figure 4:
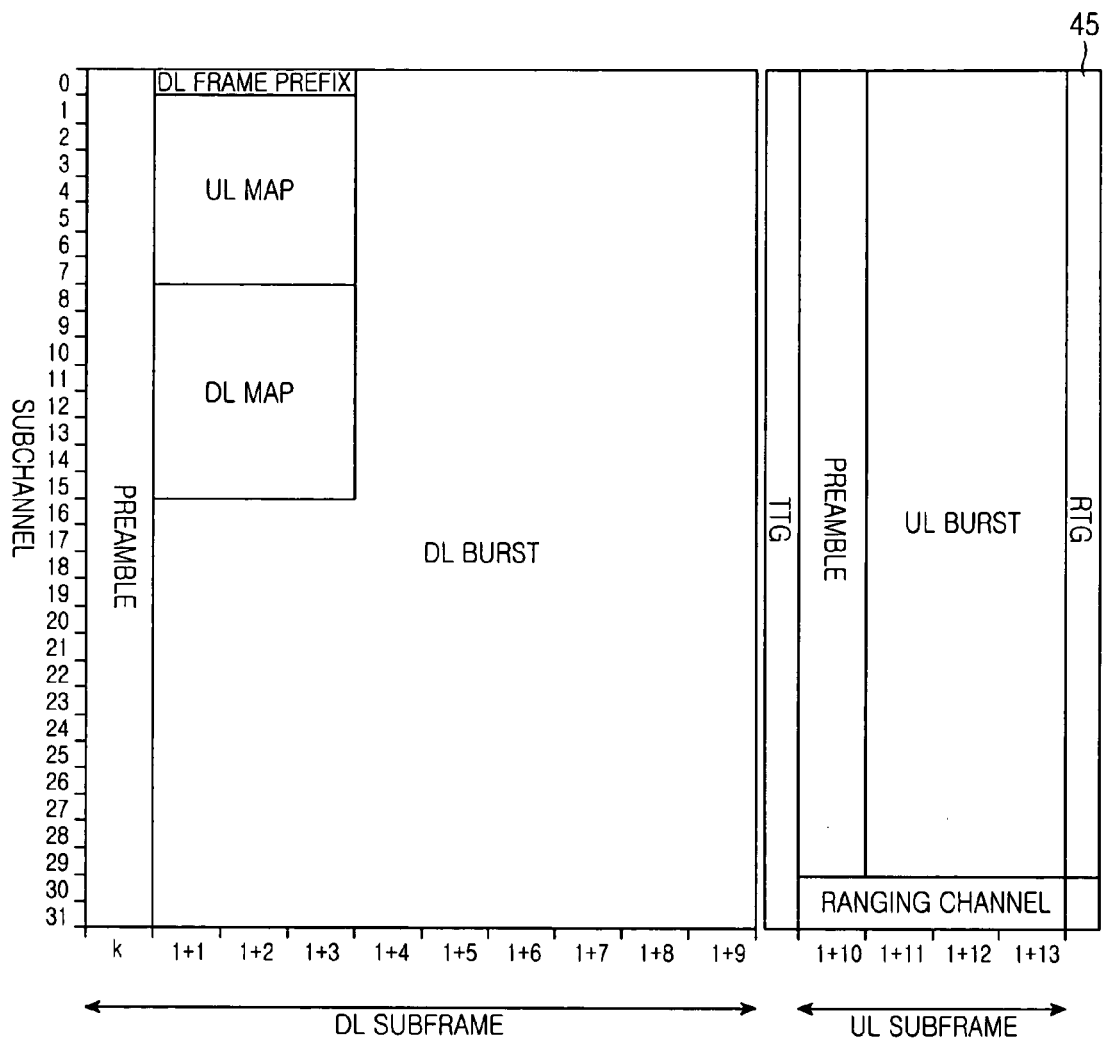
FIG. 4 is a view of a conventional HPI frame structure.

FIG. 4 is a view of a conventional HPI frame structure.

Referring to FIG. 4, the conventional HPI frame structure 40 has a frame size of about 5 ms and includes both up and down links. Also, the conventional HPI frame structure includes TTG (Transmit Time Gap) and RTG (Receive Time Gap) between the up and the down links. As shown in FIG.

4, the conventional HPI frame includes a sub frame for the down link (DL subframe, which is shown on the left side of the HPI frame) and a sub frame for the up link (UL subframe, which is shown on the right side of the HPI frame). In addition, each frame includes a preamble.

The present invention performs the DC offset cancellation during the RTG 45 included after the up links in the HPI frame by using characteristic of the above frame structure.

Figure 5:
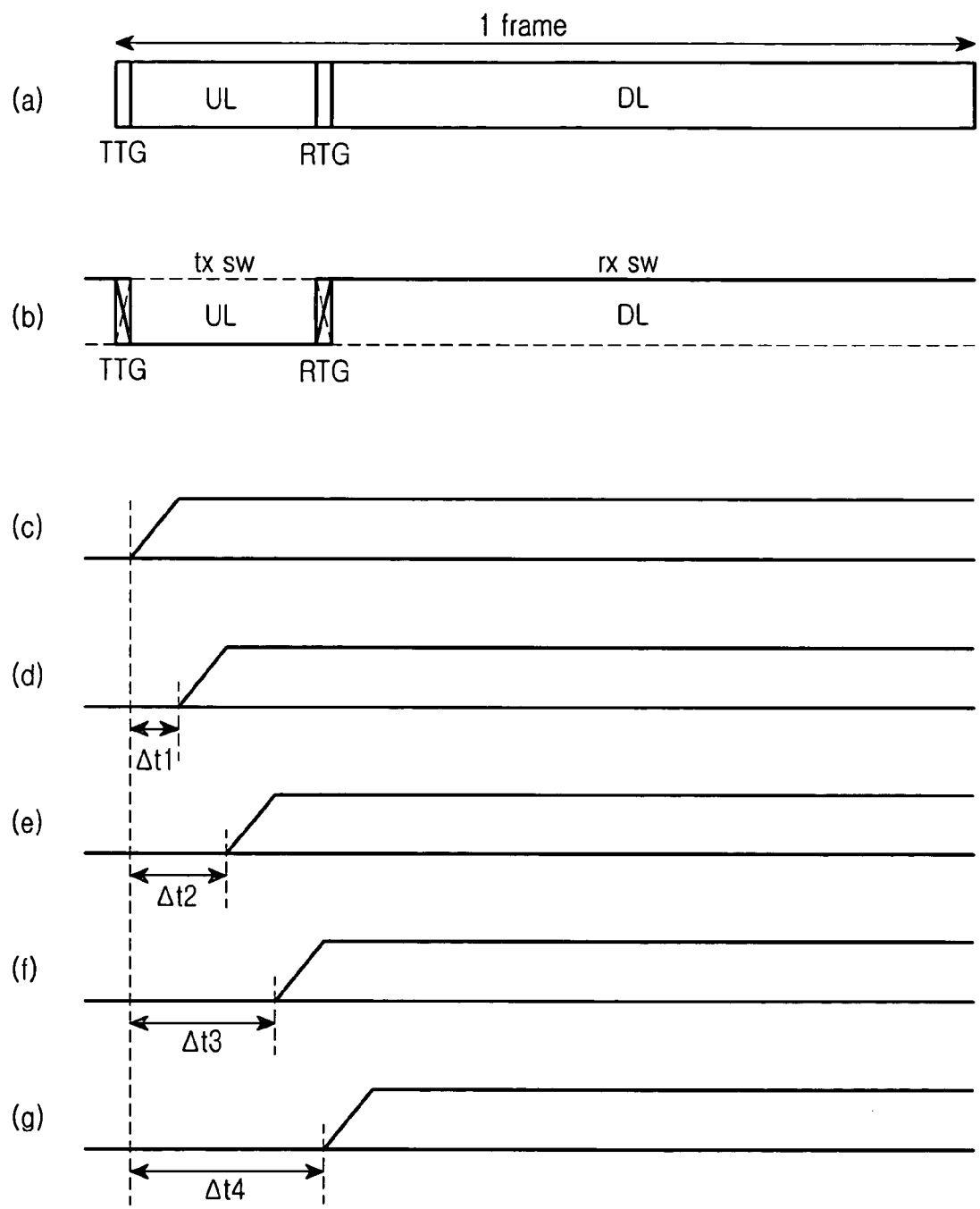
FIG. 5 is a view of a time chart of clock signals inputted into a DC offset cancellation unit according to one embodiment of the present invention.

FIG. 5 is a time chart of clock signals inputted to DC offset cancellation unit according to one embodiment of the present invention. In other words, the present invention has a characteristic that DC offset is canceled during RTG (e.g., 5 μs) and a DC offset value to be canceled in each frame is updated. Hereinafter, the above characteristics to the present invention will be described with reference to FIG. 5.

First, FIG. 5(*a*) shows a predetermined HPI frame structure. FIG. 5(*b*) shows one embodiment of performing a down link during rx_sw, represented by a solid line, and of performing an up link during tx_sw, represented by a dotted line. At this time, a predetermined receive time difference exists between the up link and the down link. FIGS. 5(*c*) to (*g*) represent enlarged views of the RTG. FIGS. 5(*c*) to (*g*) represent Rx_pwr, rega_wr, sub_1, regc_wr, and sub_2, respectively.

As mentioned above, each clock signal is generated during the RTG time so that the DC offset cancellation unit of the present invention may operate.

As described above, according to the present invention, the DC offset cancellation unit has advantages of canceling the DC offset in an active mode in real time, of canceling the DC offset, which may vary depending on time and environmental conditions, and of minimizing power consumption by using an optimized element alignment.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A DC offset cancellation apparatus in a time division duplex mode direct conversion receiver, wherein the DC offset cancellation apparatus, including a first subtracter for subtracting a predetermined DC value from a DC offset sampled from a current data channel and a second subtracter for subtracting an output value of the first subtracter from a DC offset value sampled from data channels of a next frame, cancels DC offset of a present frame during a receive time gap between data transmission frames.

2. The DC offset cancellation apparatus as claimed in claim 1, the DC offset cancellation apparatus comprising:
a first register for storing a predetermined-ideal DC value;
a second register for storing a first sampled DC offset;
the first subtracter subtracting the predetermined-ideal DC value stored in the first register from the first sampled DC offset stored in the second register;
a third register for temporarily storing a result value of the first subtracter until a second sampled DC offset value of a next data transmission frame is stored in the second register; and
the second subtracter subtracting the result value temporarily stored in the third register from the second sampled DC offset value.

3. The DC offset cancellation apparatus as claimed in claim 2, wherein the second register, the first subtracter, the third register, and the second subtracter are controlled by clocks sequentially generated within the receive time gap between the data transmission frames.

4. The DC offset cancellation apparatus as claimed in claim 2, wherein the first register downloads the predetermined-ideal DC value from an external device and stores the downloaded predetermined-ideal DC value.

5. The DC offset cancellation apparatus as claimed in claim 3, wherein the clocks controlling the second register, the first subtracter, the third register, and the second subtracter are each generated after a predetermined time delay.

6. A method of canceling DC offset in a time division duplexing mode direct conversion receiver, comprising:
storing a predetermined-ideal DC value;
storing a first sampled DC offset of a first data transmission frame;
subtracting the predetermined-ideal DC value from the first sampled DC offset and temporarily storing the result;
waiting a receive time gap between data transmission frames;
sampling a second sampled DC offset value of a next data transmission frame; and
subtracting the temporarily stored result from the second sampled DC offset value.

* * * * *